United States Patent [19]

Jeshurun et al.

[11] Patent Number: 5,165,301
[45] Date of Patent: Nov. 24, 1992

[54] STEERING MEMBERS FOR BICYCLES

[76] Inventors: David R. Jeshurun, 952 Ridgedale, Birmingham, Mich. 48009; Joe Toth, 2001 Burger, Dearborn, Mich. 48128

[21] Appl. No.: 688,325

[22] Filed: Apr. 22, 1991

[51] Int. Cl.$^5$ .............................................. B62K 21/12
[52] U.S. Cl. .................................. 74/551.1; 74/551.4; 74/551.6; 280/261
[58] Field of Search ........................... 74/551.1–551.9, 74/488, 489; 280/264, 261, 279

[56] References Cited

U.S. PATENT DOCUMENTS

| D. 298,309 | 11/1988 | Coue | D12/179 |
|---|---|---|---|
| 376,368 | 8/1887 | Copeland | 74/551.2 |
| 420,805 | 2/1890 | Keating | 280/264 |
| 437,827 | 10/1890 | White | 280/264 |
| 507,513 | 10/1893 | Warwick | 280/264 |
| 651,591 | 6/1900 | Brintnell | 74/551.2 |
| 2,294,839 | 9/1942 | Duffy | 74/551.2 |
| 2,341,821 | 2/1944 | Schwinn | 74/551.2 |
| 2,583,947 | 11/1948 | Keetch | 74/551.2 |
| 2,641,629 | 6/1953 | Bennett, Jr. | 74/551.1 |
| 3,879,048 | 4/1975 | Penney | 74/551.9 |
| 4,143,557 | 3/1979 | Wakebe | 74/217 B |
| 4,245,522 | 1/1981 | Robinson | 74/551.1 |
| 4,462,267 | 7/1984 | Shimano | 74/551.1 |
| 4,503,729 | 3/1985 | Shimano | 74/551.1 |
| 4,653,768 | 3/1987 | Keys | 280/279 |
| 4,750,754 | 6/1988 | Lennon | 74/551.1 |
| 4,811,921 | 3/1989 | Whitaker et al. | 74/551.9 |
| 4,856,364 | 8/1989 | Dixon | 74/551.8 |

FOREIGN PATENT DOCUMENTS

| 0001646 | 5/1979 | European Pat. Off. | 74/551.1 |
|---|---|---|---|
| 0688541 | 2/1940 | Fed. Rep. of Germany | 74/551.9 |
| 3306269 | 8/1984 | Fed. Rep. of Germany | 74/551.1 |
| 1221709 | 7/1960 | France | 74/551.9 |
| 2535669 | 5/1984 | France | 74/551.1 |

Primary Examiner—David A. Scherbel
Assistant Examiner—Winnie Yip
Attorney, Agent, or Firm—Robert L. Marsh

[57] ABSTRACT

A steering member for a bicycle has extension sections extending outwardly from the central mounting section and a pair of opposed handgrip sections positioned adjacent to the ends of the extension sections. The extension sections are contoured along their length to have a cross-sectional shape and other contours which are complementary to the shape of the hand of the rider. Also, the handgrip sections have enlarged handgripping surfaces, that is, the curves which form the upper surfaces are adapted to be complementary to the curve of the palm of the rider's hand and the outer edges have curves adapted to be encircled by the fingers of the rider's hands.

2 Claims, 15 Drawing Sheets

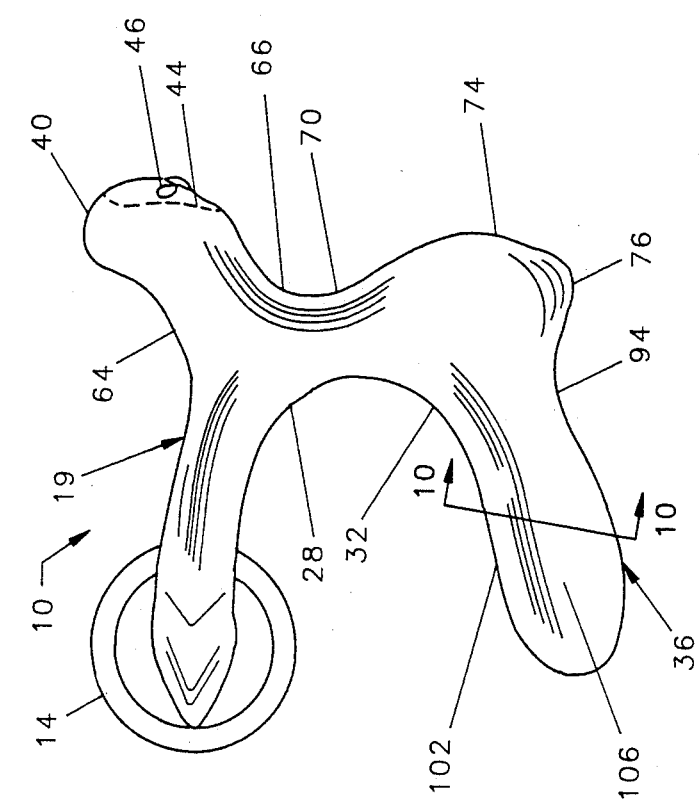
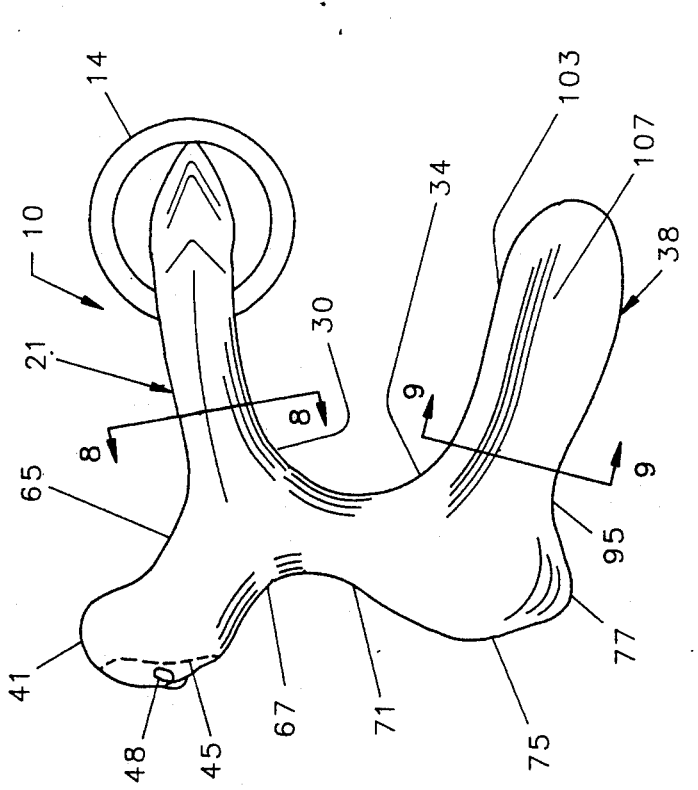
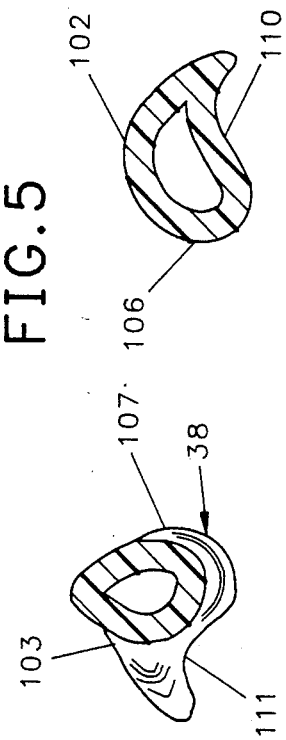
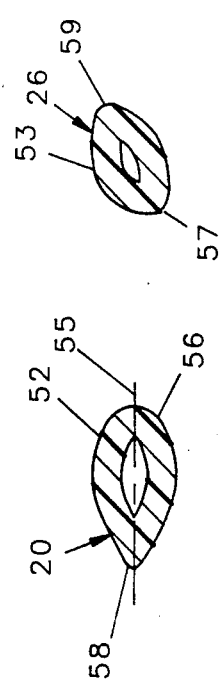

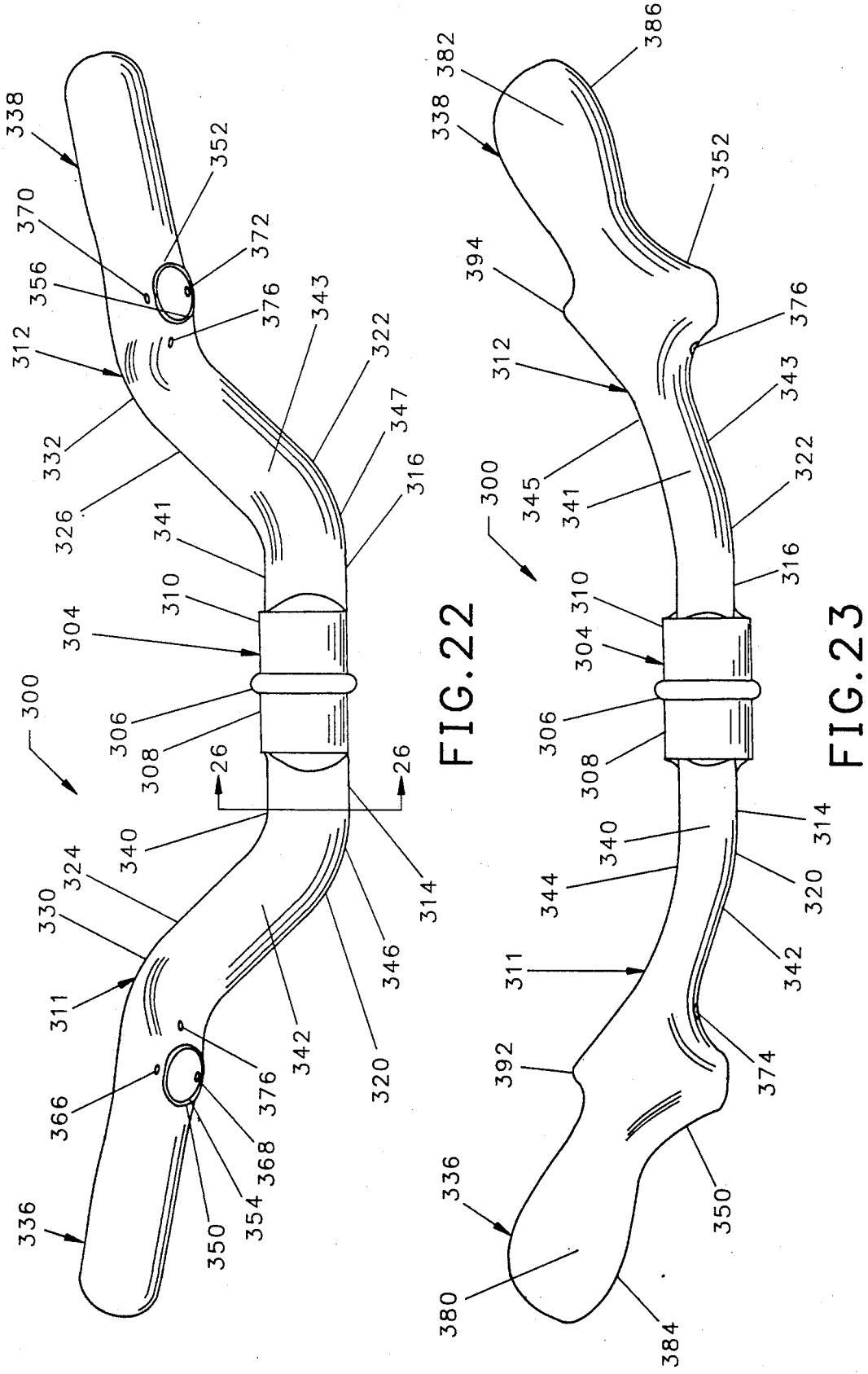

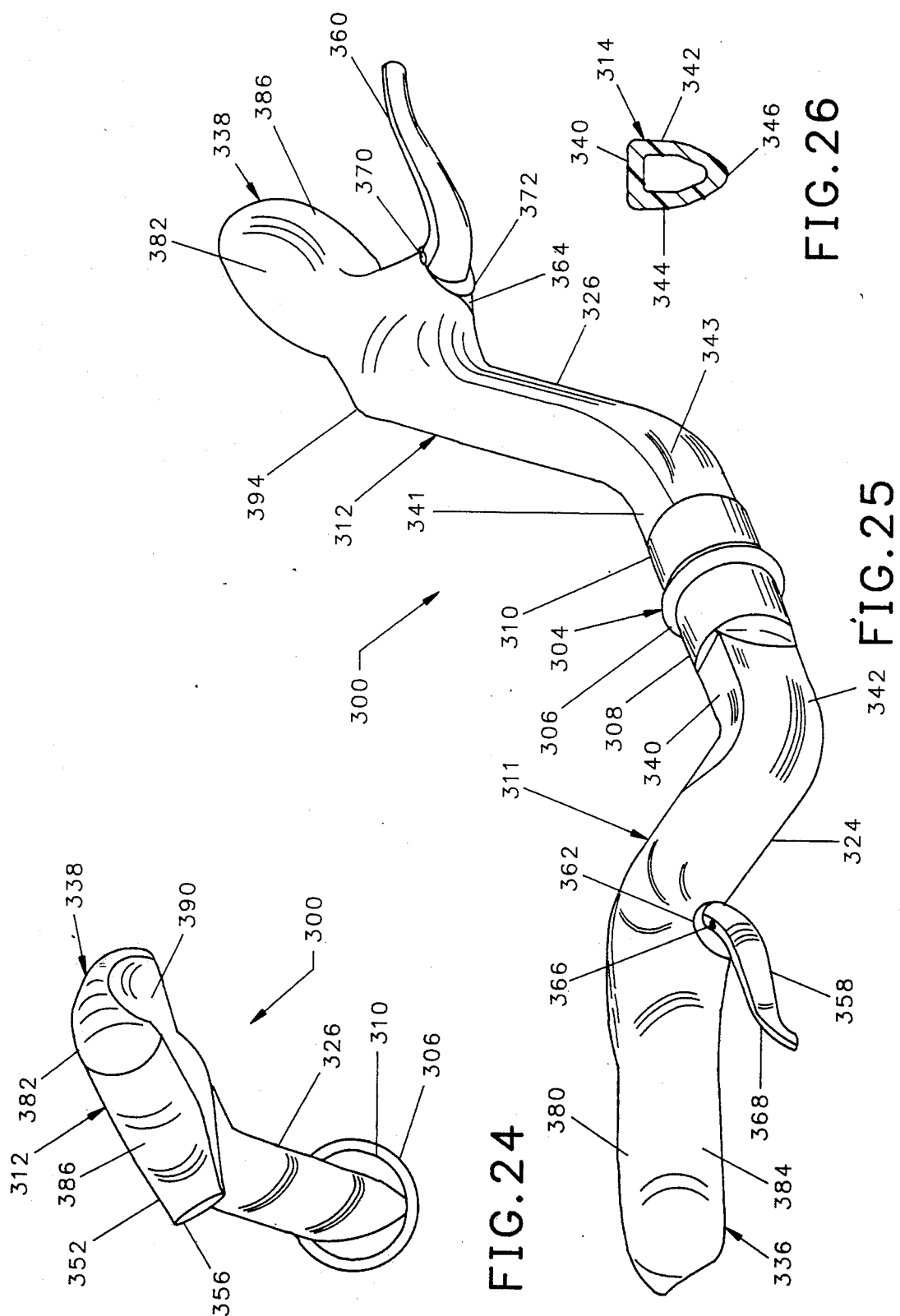

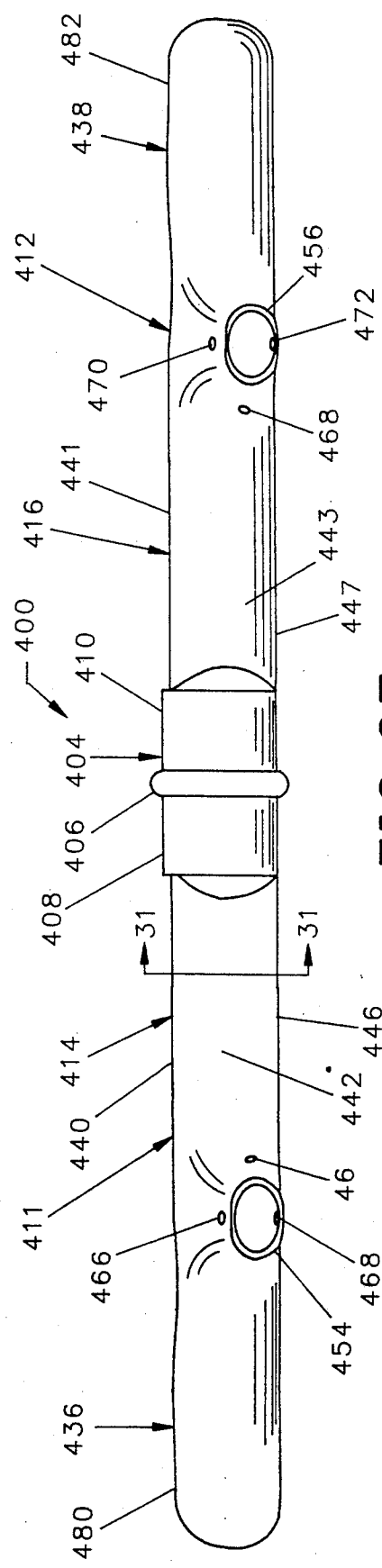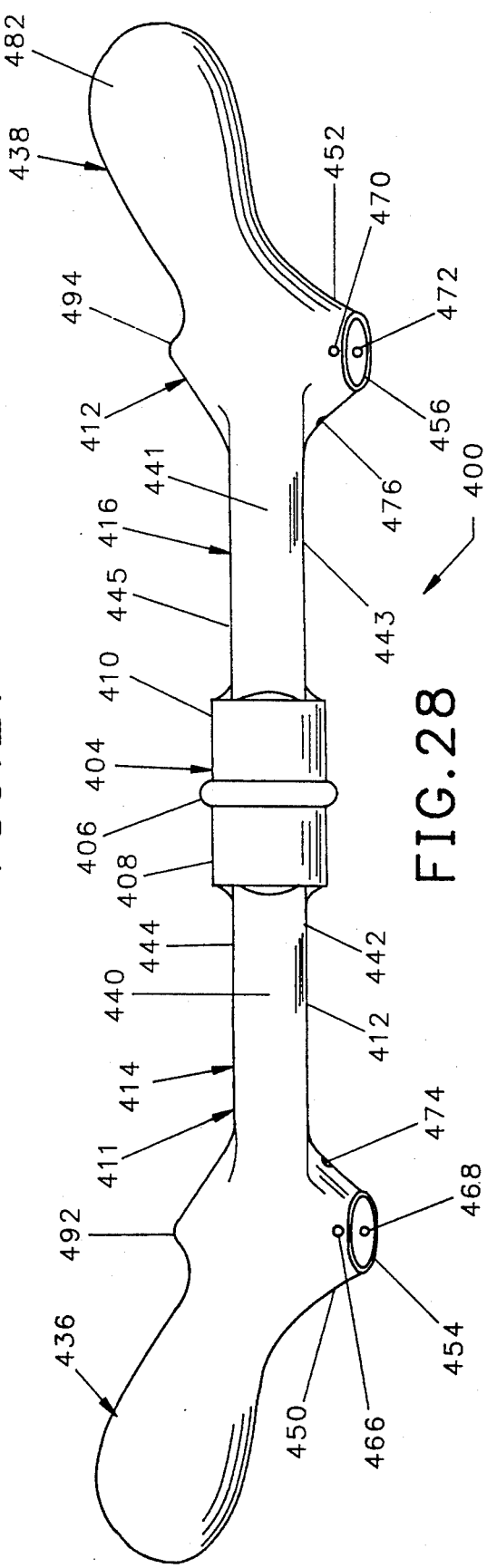

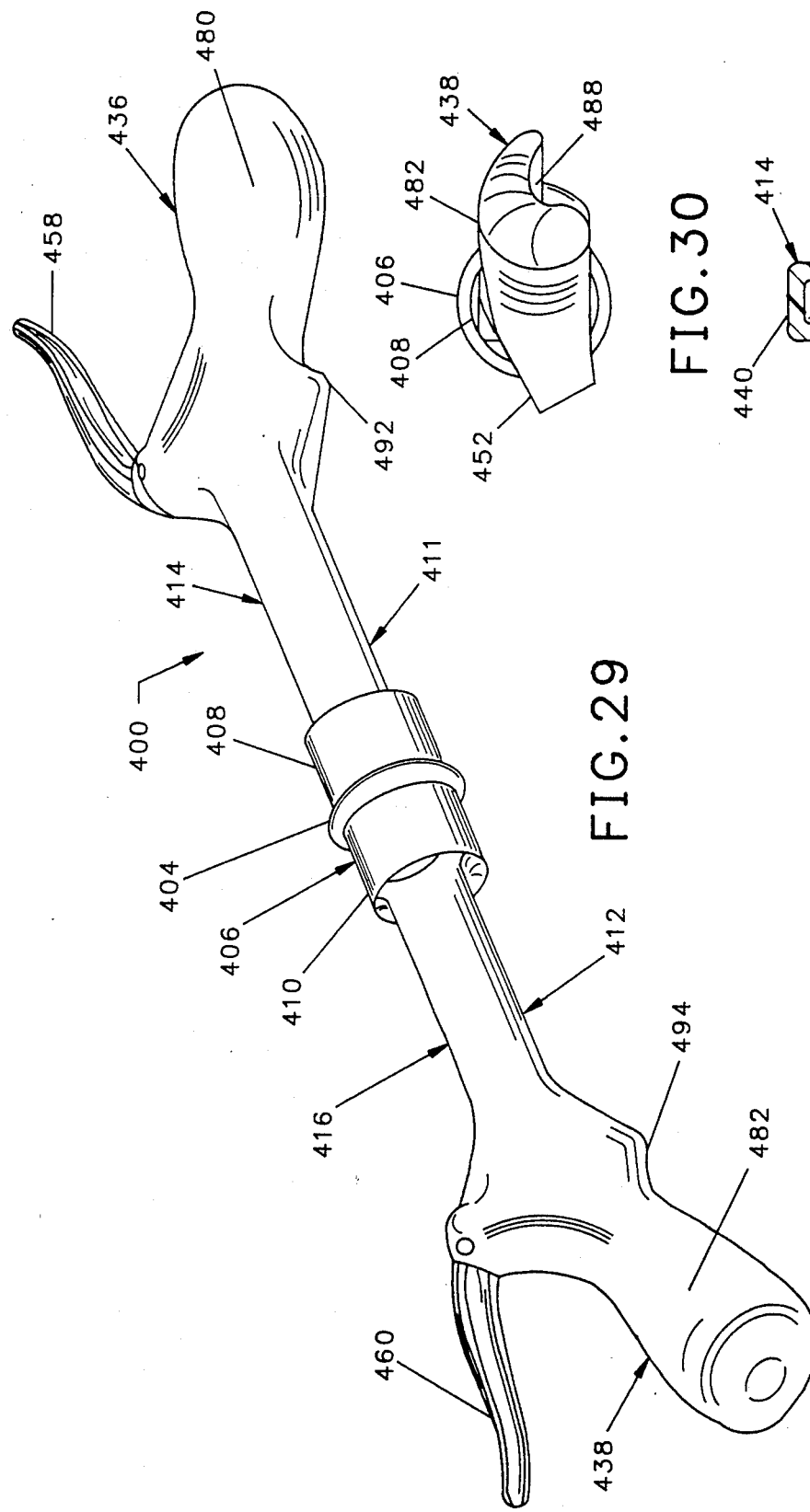
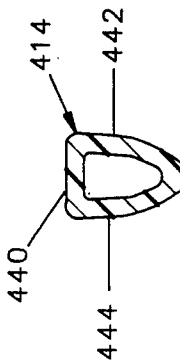
FIG. 29
FIG. 30
FIG. 31

STEERING MEMBERS FOR BICYCLES

This invention relates in general to improvements in the steering members utilized in the steering of bicycles, and it particularly relates to a steering member or handle bar which provides improved ergonomic and shock absorbing features for the rider of a bicycle.

BACKGROUND OF THE INVENTION

Bicycles have two wheels with a rider's seat positioned on a frame extending between the wheels, the front wheel being connected by a fork assembly and a stem to a steering member or handle bar. A typical steering member consists of a symetrically curved 1-inch diameter metal bar which may have tape or other resilient material wrapped along at least a portion of the length of the bar to improve the grip of the hands thereon.

Modern bicycles are designed for specific purposes, and those intended for speed and distance are designed such that for optimum performance the rider stands on the pedals with his back substantially parallel to the pavement with the weight of his upper body supported by his hands on the steering member. This posture results in a considerable amount of weight being supported by the rider's arms, and consequently, the rider will move his hands from place to place on the stearing member to reduce the stress inflicted on the hands. Not only do the hands support a great amount of weight, but such bicycles have thin tires inflated under high air pressure such that little of the shock between the pavement and the wheel is absorbed by the tires and a great deal of it is transmitted through the fork and stem to the steering member and to the hands of the bicycle rider.

Bicycles which are designed for riding over rough terrain, on the other hand, have steering members which are nearly linear in shape, some of which have raised outer ends. Such steering members are meant to be grasped only at the outer ends in order to maintain control while the front wheel is crossing irregular terrain.

It would be desirable to provide a steering member which ergonomically fits the human hands and distributes the weight and pressure to the rider's body over a greater portion of each hand. It would also be desirable to provide a steering member which will absorb a greater portion of the shock and reduce impact and stress to the hands.

Prior efforts to provide plastic steering members for bicycles such as shown in U.S. Pat. No. 4,245,522 require the assembly of numerous pieces and offer only a modest improvement in comfort to the hands over metal bar steering members.

SUMMARY OF THE INVENTION

Briefly, the present invention provides for a steering member having a central section which is adapted to be mounted on the stem of a bicycle. The steering member has extension sections extending outwardly from the central mounting section and a pair of opposed handgrip sections positioned adjacent to the ends of the extension sections. In the embodiments meant for speed and distance, the extension sections are contoured along their length to have a cross-sectional shape and other contours which are complementary to the shape of the hand of the rider. Also, hand grip sections in all of the described embodiments of the invention have enlarged handgripping surfaces, that is, the curves which form the upper surfaces are adapted to be complementary to the curve of the palm of the rider's hand and the outer edges have curves adapted to be encircled by the fingers of the rider's hands.

GENERAL DESCRIPTION OF THE DRAWINGS

The present invention will be better understood from a reading of the following detailed description taken in connection with the drawings wherein:

FIG. 4 is an end view of the steering member shown in FIG. 1, taken from hand side thereof;

FIG. 5 is an end view of the steering member shown in FIG. 1 taken from the right hand side thereof;

FIG. 7 is a cross-sectional view taken along the line 7—7 in FIG. 1;

FIG. 8 is a cross-sectional view taken along the line 8—8 in FIG. 4;

FIG. 9 is a cross-sectional view taken along the line 9—9 in FIG. 4;

FIG. 10 is a cross-sectional view taken along the line 10—10 in FIG. 5;

FIG. 22 is a front elevation of a third embodiment of the invention;

FIG. 23 is a top view of the embodiment shown in FIG. 22;

FIG. 24 is an isometric end view of the embodiment shown in FIG. 22;

FIG. 25 is a perspective view of the embodiment shown in FIG. 22;

FIG. 26 is a cross-sectional view taken along the line 26—26 in FIG. 22;

FIG. 27 is a front elevational view of a fourth embodiment of the invention;

FIG. 28 is a top view of the embodiment shown in FIG. 27;

FIG. 29 is a perspective view of the embodiment shown in FIG. 27;

FIG. 30 is an end view of the embodiment in FIG. 27; and

FIG. 31 is a cross-sectional view of the embodiment shown in FIG. 27 taken along line 31—31 of FIG. 27.

DETAILED DESCRIPTION OF THE INVENTION

Figure 1:
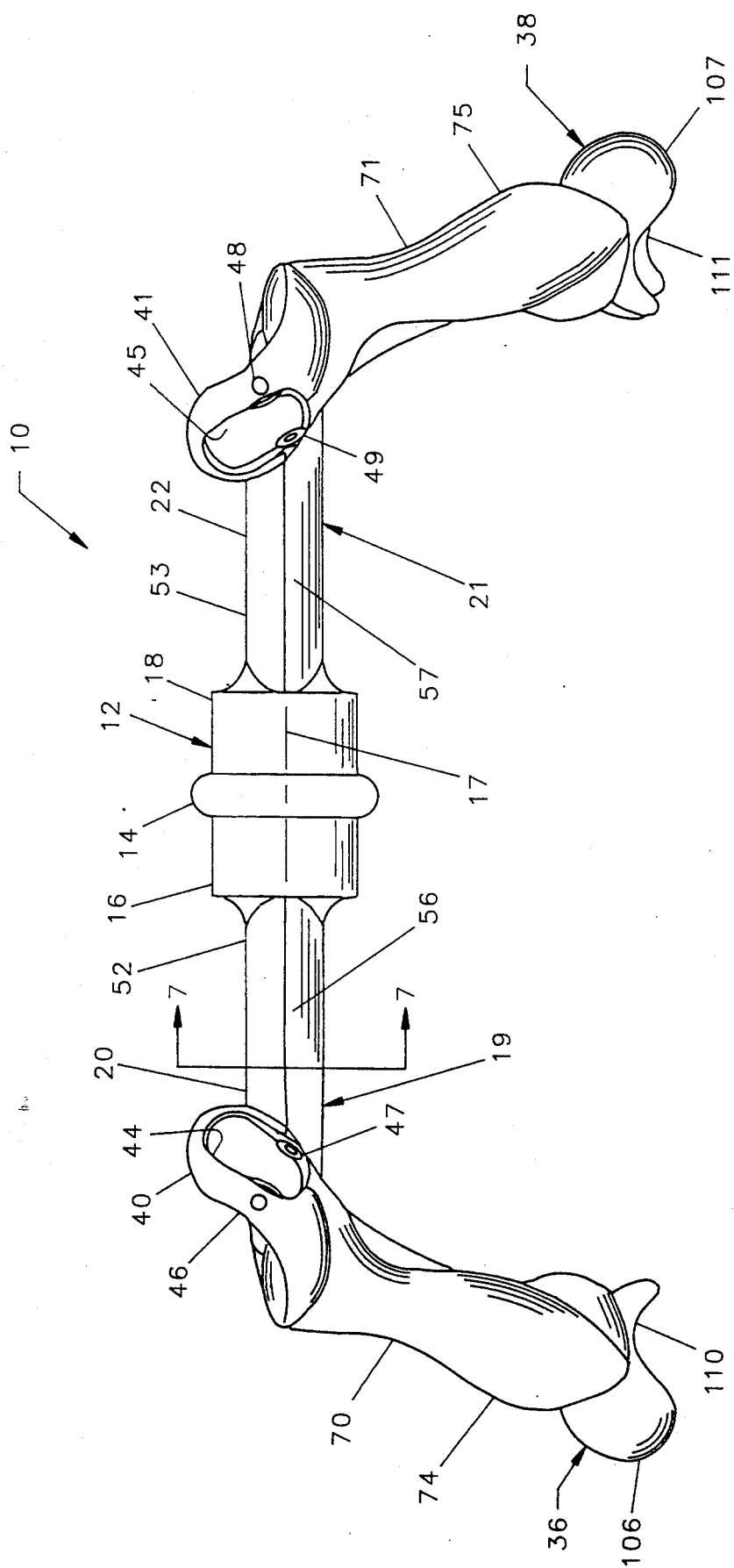
FIG. 1 is a front plan view of a preferred embodiment of a steering member constructed in accordance with the present invention.
Figure 2:
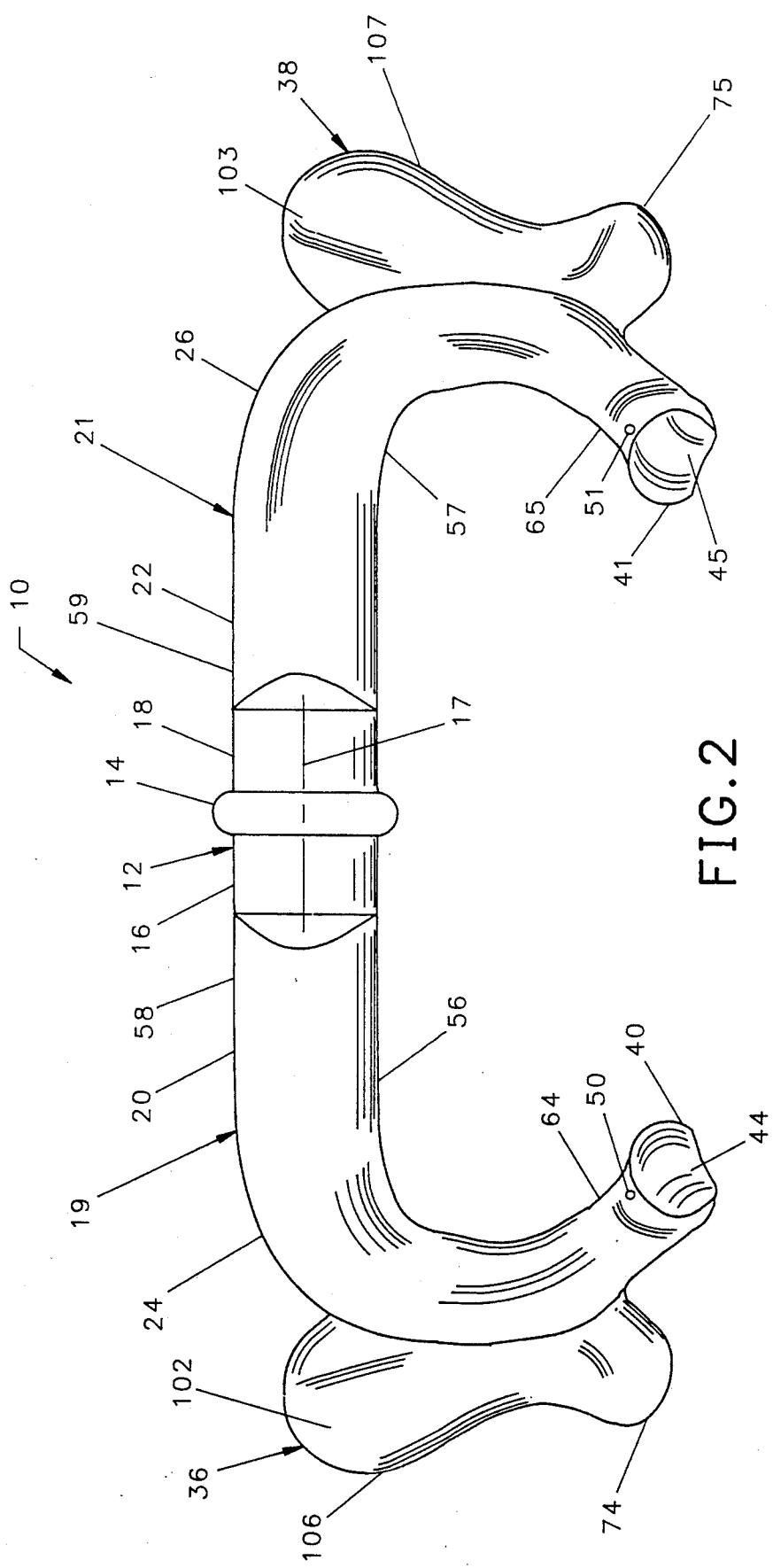
FIG. 2 is a top view of the steering member shown in FIG. 1.
Figure 3:
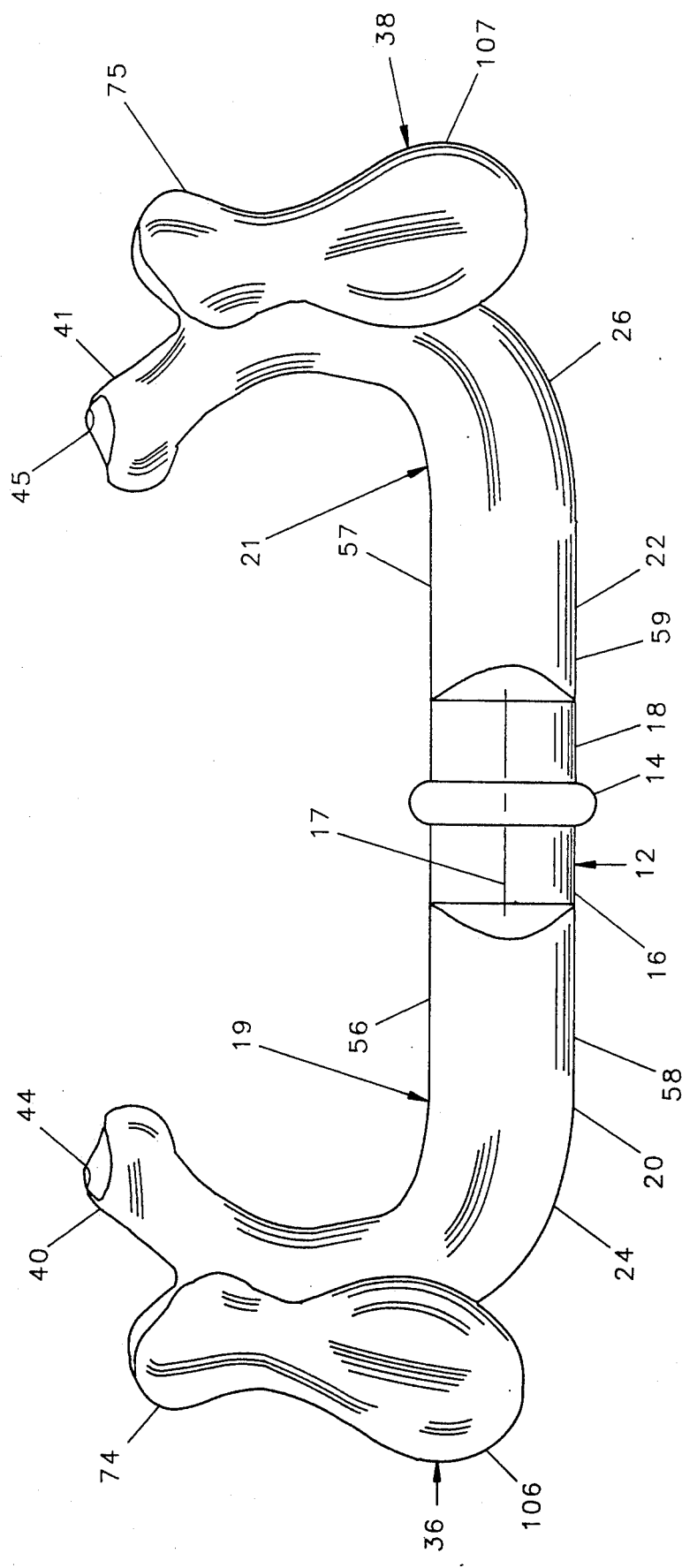
FIG. 3 is a bottom view of the steering member shown in FIG. 1.
Figure 6:
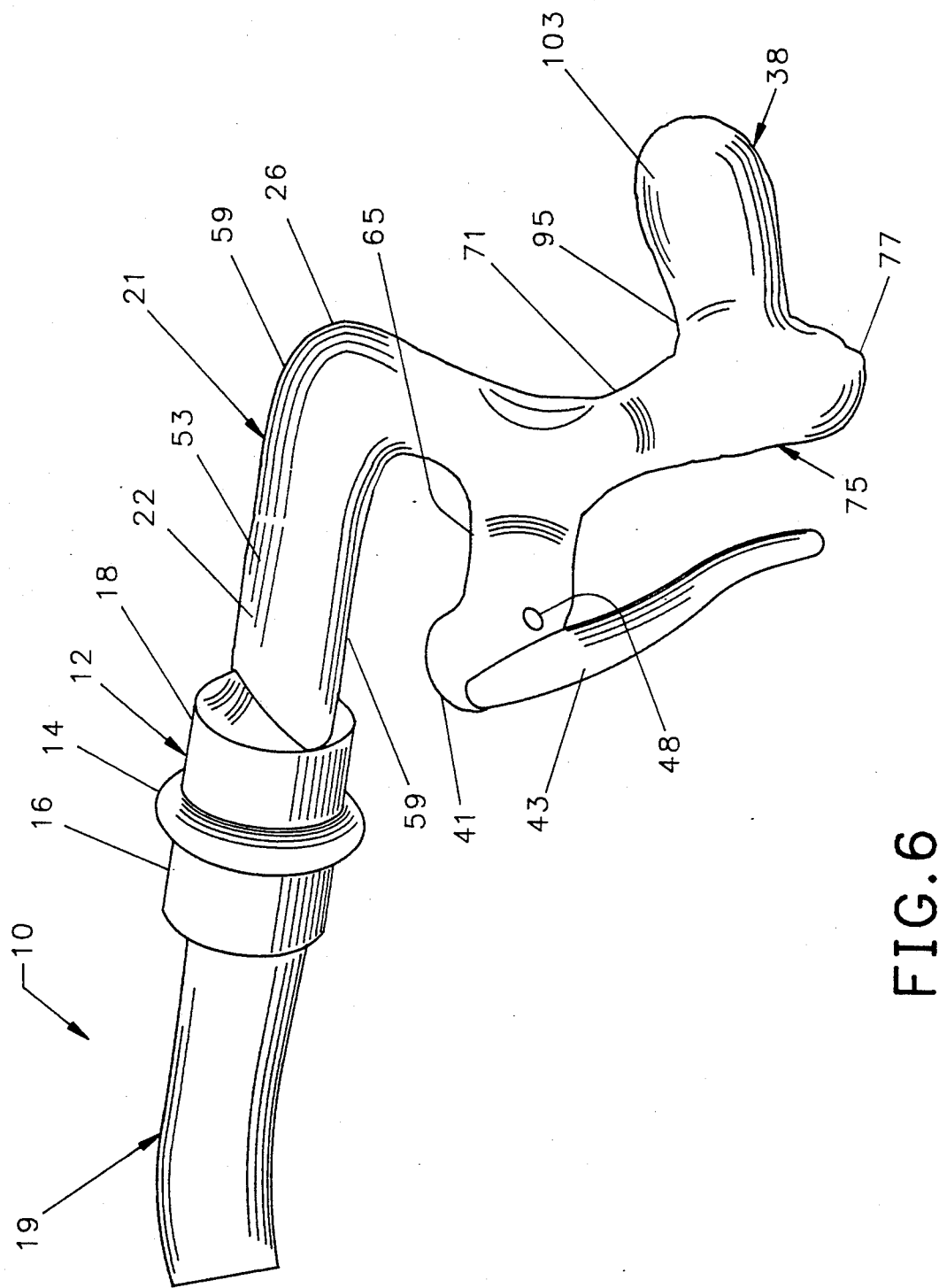
FIG. 6 is a fragmentary perspective view of the embodiment shown in FIG. 1, particularly showing a brake lever mounted in the steering member.

Referring to FIGS. 1-6, a preferred embodiment of the invention may be seen to include a steering member 10, having a centrally located stem mounting section 12. The stem mounting section 12 has a centrally located annular ridge 14 disposed in transverse relationship to the length of the steering member 10, and cylindrical sections 16 and 18 on respective sides of the annular ridge 14. A clamp attached to the stem to the front wheel, not shown, has a centered groove to accommodate the annular ridge 14, and grasp the cylindrical sections 16 and 18 to hold the steering member 10 in a centered mounted position. The mounting position of the steering member 10 may be adjusted by selectively rotating the steering member 10 around the longitudinal axis 17 of the sections 16 and 18 and then tightening the clamp to hold the steering member in the position most ergonomically suitable to the rider.

The steering member 10 is symmetrical around the mounting section 12, and outwardly, adjacent to the cylindrical sections 16 and 18 are extensions 19, 21, respectively, portions of which are adapted to be grasped by a rider. The extensions 19, 21 are best described in sections, beginning with the sections adjacent the cylindrical sections 16 and 18, are horizontal straight sections 20 and 22 respectively through. Adjacent to the straight section 20, 22 and outwardly therefrom are first curved sections 24, 26 thereof. best shown in FIG. 2, which turn the further extensions of the steering member 10 in a forward direction. Adjacent to the first curved sections 24, 26 are second curved sections 28, 30, best shown in FIGS. 4 and 5, which turn the further extensions of the steering member in a downward direction. Adjacent the second curved sections 28, 30 are third curved sections 32, 34 which turn the further extensions of the steering member in a backward direction. Finally, adjacent the third curved sections 32, 34 are backwardly extending straight handgrip sections 36, 38 which are at the distal ends of the extensions 19, 21, respectively.

Between the first curved sections 24, 26 and the second curved sections 28, 30 of the extensions 19, 21 the invention provides for forwardly and inwardly projecting pedestals 40, 41. Depending on the orientation of the steering member 10 in which the stem mounting section 12 is clamped to the stem, the pedestals 40, 41 may also project somewhat in an upwardly direction. The pedestals 40, 41 are adapted to receive respective ones of a pair of hand brake actuating levers 43 one of which is shown, one brake lever being provided to actuate the brakes on the front wheel and being mounted on one of such pedestals, and the other brake lever being provided to actuate the brake on the rear wheel and being mounted on the other of such pedestals. The hand brake levers 43 are mounted into slots 44, 45 and pivot on pins, not shown, which are inserted through holes 46, 47 and 48, 49. One end of a wire surrounded by a sheathing, not shown, is attached to each brake. The other ends of the wires are passed through holes 50, 51 and are attached to the associated brake levers 43. The sheathings surrounding the respective wires are attached to the steering member 10 by clamps inserted through the holes 50, 51 such that compression of each of the brake levers will draw the wire through its sheathing to actuate the corresponding brake.

Referring to FIG. 7, the straight sections 20, 22 may be seen to have cross-sections which are generally elliptical in shape with the principal longitudinal axis 55 of the ellipse being horizontal such that the upper surfaces 52, 53 are broad and curved so as to complement the palm of the rider's hand. As can be seen, the straight sections 20, 22 further have gently curved leading edges 56, 57 and more sharply curved trailing edges 58, 59 adapted to fit the curl of the fingers and thumb of the rider's hand respectively. As seen in FIG. 8, the elliptical cross-section continues through the first curved sections 24, 26.

The pedestals 40, 41 have a substantially circular cross section and are joined to the steering member 10 by upper curves 64, 65 and lower curves 66, 67. The cross-section of the steering member 10 on each side of the curved sections 64, 65, 66, 67 is generally circular and is suitable for grasping either by the index finger and thumb only, or by the entire hand. Below the second curved sections 28, 30 and above the third curved sections 32 and 34, are first necks 70, 71 which have a substantially circular cross section with diameters again suitable for grasping with the rider's index finger and the thumb. At the upper end of the third curved sections 32, 34 and below the first necks 70, 71 the steering member 10 has a bulbous or pear shaped sections 74, 75, shaped so as to complement the palm of the hand when the fingers and thumb of the rider are wrapped around the first necks 70, 71. Portions of the bulbous sections 74, 75 extend below the arc of the third curved sections 32, 34 as projections 76, 77, as best shown in FIG. 4 and FIG. 5, so as to provide gripping positions for all the fingers of the rider's hand.

At the lower ends of the third curved sections 32, 34 and between the bulbous sections 74, 75 and the straight handgrip sections 36, 38 the steering member 10 again narrows to second necks 94, 95 having diameters suitable for gripping with the rider's index finger and thumb. As shown in FIG. 9 and FIG. 10, rearward of the second necks 94, 95 the steering member 10 enlarges to the straight handgrip section 36, 38. The upper surfaces 102, 103 of the straight hand grip sections 36, 38 are curved and present a relatively broad horizontal surface which complements the contour of the palm of the hand of a rider. The handgrip sections 36, 38 have a generally comma shaped cross-section with the tail of the comma corresponding to the curved upper surfaces 102, 103. The outer edges 106, 107 of the straight handgrip sections 36, 38 are rounded, and complement the curl of the fingers of the rider's hand. The outer edges 106, 107 correspond to the rounded end of the comma shaped cross-sections. Finally, the straight handgrip sections 36, 38 have longitudinal recesses 110, 111 along their undersides to receive the finger tips of a rider's hand and complete the comma shape of the cross-section.

Figure 11:
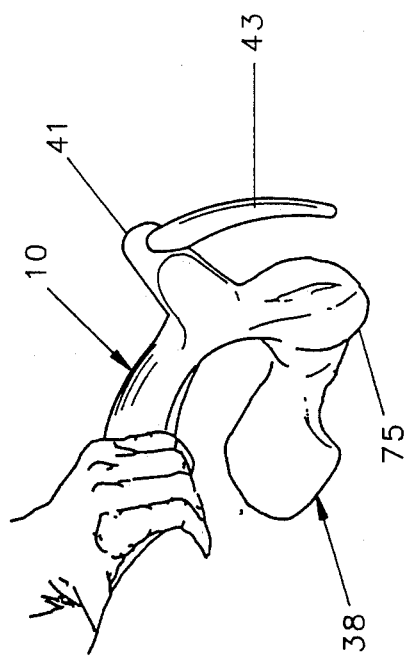
FIG. 11 is a perspective view of a rider's hand in a first gripping position on a steering member.

The steering member as set forth above is contoured to provide several specific gripping positions which can be comfortably held by a rider. As shown in FIG. 11 straight sections 20, 22 can be grasped by curling the fingers around the leading edges 56, 57 and the thumb around trailing edges 58, 59 such that, the palm of the rider's hand will rest on the broad upper surfaces 52, 53 and thereby disperse the riders weight over a wide area. The oval cross-sections also provides a lesser drag coefficient than does a circular cross-section when it is on a bicycle being operated at a high speed.

Figure 12:
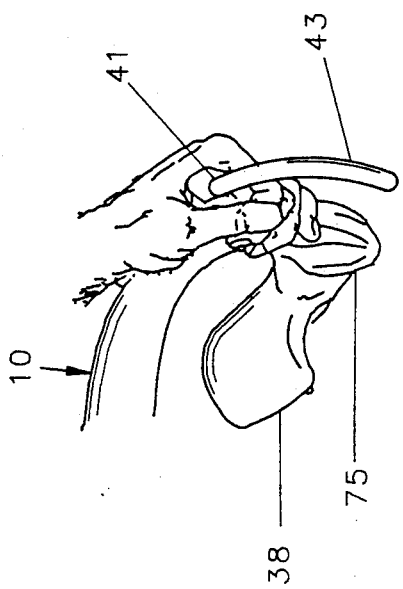
FIG. 12 is a perspective view of a rider's hand in a second gripping position on a steering member.

As shown in FIG. 12, the rider may also wrap his thumb and fingers around the pedestals supporting the brake levers. From this position the rider can extend his fingers and grasp the downwardly extending brake levers 42, 43 to actuate the brakes. The pedestals are sufficiently long that they may also be grasped by the entire hand of the rider with the portion of the palm near the wrist resting on the joining curves 64, 65.

Figure 14:
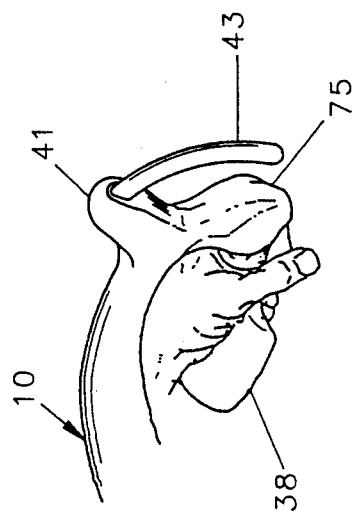
FIG. 14 is a perspective view of a rider's hand in a fourth gripping on a steering member.
Figure 13:
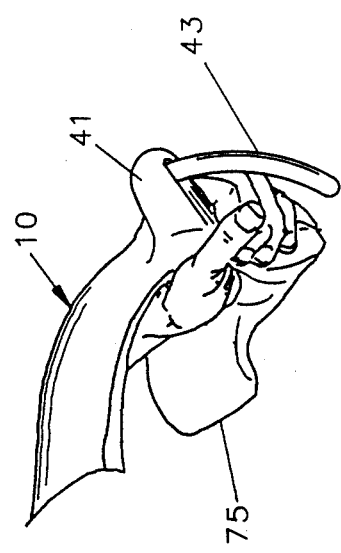
FIG. 13 is a perspective view of a rider's hand in a third gripping position on a steering member.

As shown in FIG. 13, the bulbous sections 74, 75 are intended to be grasped by the hand at an approximately 45 degree angle to the horizontal with the bulbous section 74, 75 occupying the palm of the hand. The thumb and index finger wrap around the first necks 70, 71 and the small fingers wrap around the projections 76, 77 of the bulbous sections 74, 75. Finally, as shown in FIG. 14, the straight hand grip sections 36, 38 are intended to be grasped with the palm on the curved upper surfaces 102, 103, the fingers wrapped around the outer edges 106, 107 with the fingers resting in longitudinal recesses 110, 111, and the thumb and index finger wrapping around the second necks 94, 95.

A second embodiment of the invention is shown in FIGS. 15 to 21. Referring to FIGS. 15 to 19, a steering member 150 has at its center a stem mounting section 154. The stem mounting section 154 includes a centrally located annular ridge 156, extending in a direction transverse to the length of the steering member, and cylindrical sections 158, 160 adjacent opposite sides of the annular ridge 156. A clamp attached to the stem, not shown, is adapted to accept the annular ridge and grasp the cylindrical sections 158, 160 to hold the steering member in a position transverse to the stem. The steering member 150 may be rotated around its longitudinal axis while within the clamp such that it can be adjusted to a position which is the most ergonomically desirable to the rider.

Adjacent to the outer ends of cylinderical sections 158, 160 and extending axially outwardly therefrom are extensions 162, 163, respectively, each of which is described hereinafter. Adjacent the cylindrical sections 158, 160 are horizontal straight sections 166, 168 of extensions 162, 163 respectively. Outwardly ends of horizontal straight sections 166, 168 are angular sections 170, 172 directing further extensions of the steering member 150 forwardly at an approximate angle of 45° from the axis of the straight sections 166, 168. Axially outwardly and forwardly of angular sections 170, 172 are forward projecting horizontal straight sections 174, 176. Axially forwardly of forwardly projecting sections 174, 176 are downward section 178, 180 which extend downwardly and rearwardly at an angle of approximately 60° and slightly outwardly from forwardly projecting sections 174, 176. Forwardly offset from the intersection of forwardly projecting sections 174, 176 and downward sections 178, 180 are pedestals 184, 186. The pedestals 184, 186 project in a generally upward and forward and somewhat inward direction, and each have longitudinal axis which are substantially parallel to the longitudinal axis of the adjacent downward section 178, 180. The upper portions of the pedestals 184, 186 each have apertures 188, 190 respectively adapted to receive brake levers 192, 194 which pivot on pins, not shown, which pass through holes 200, 202, and 204, 206 respectively. The brake levers 192, 194 are connected to steel cables drawn through sheathings, not shown, to actuate the brakes. The steel cables pass through holes 208, 210, and the sheathing is attached by a clamp to the surface of the pedestals 184, 186 adjacent holes 208, 210, such that actuation of the brake levers 192, 194 draws the steel cable through the sheathing. One brake lever actuates a brake on the front wheel and the other brake lever actuates a brake on the rear wheel.

Figure 15:
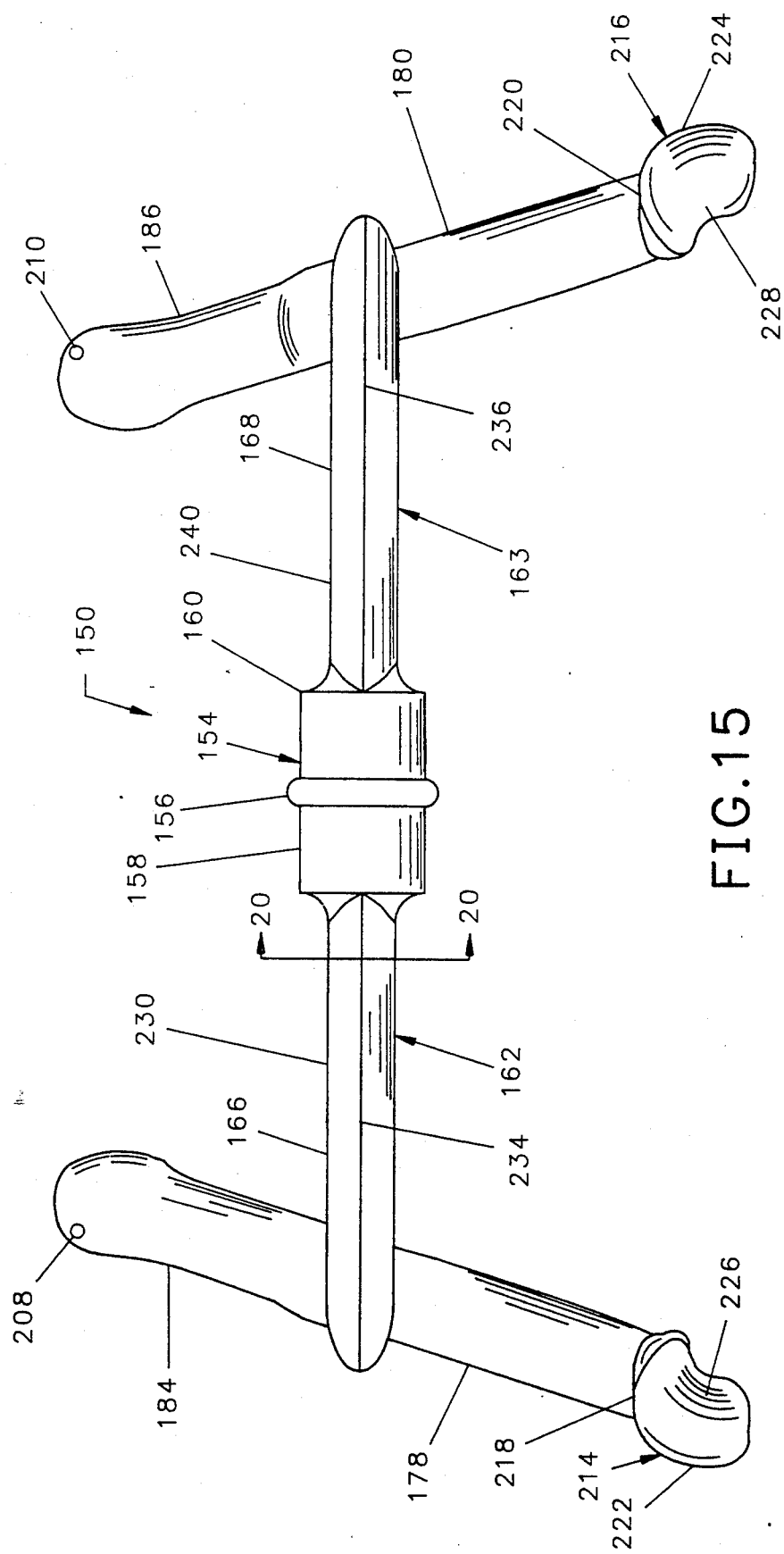
FIG. 15 is a front elevation of a second embodiment of the invention.
Figure 16:
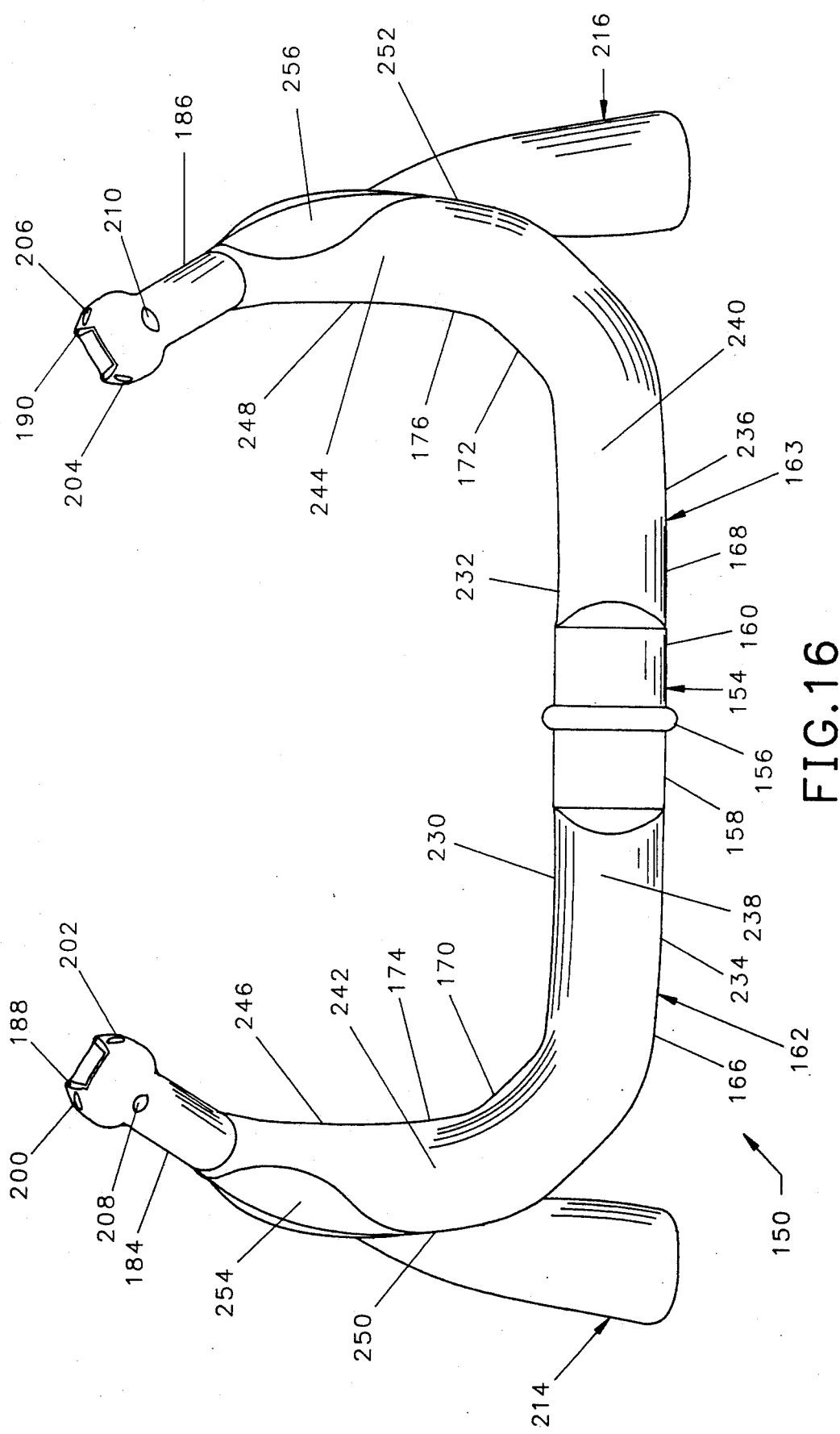
FIG. 16 is a top view of the embodiment shown in FIG. 15.
Figure 19:
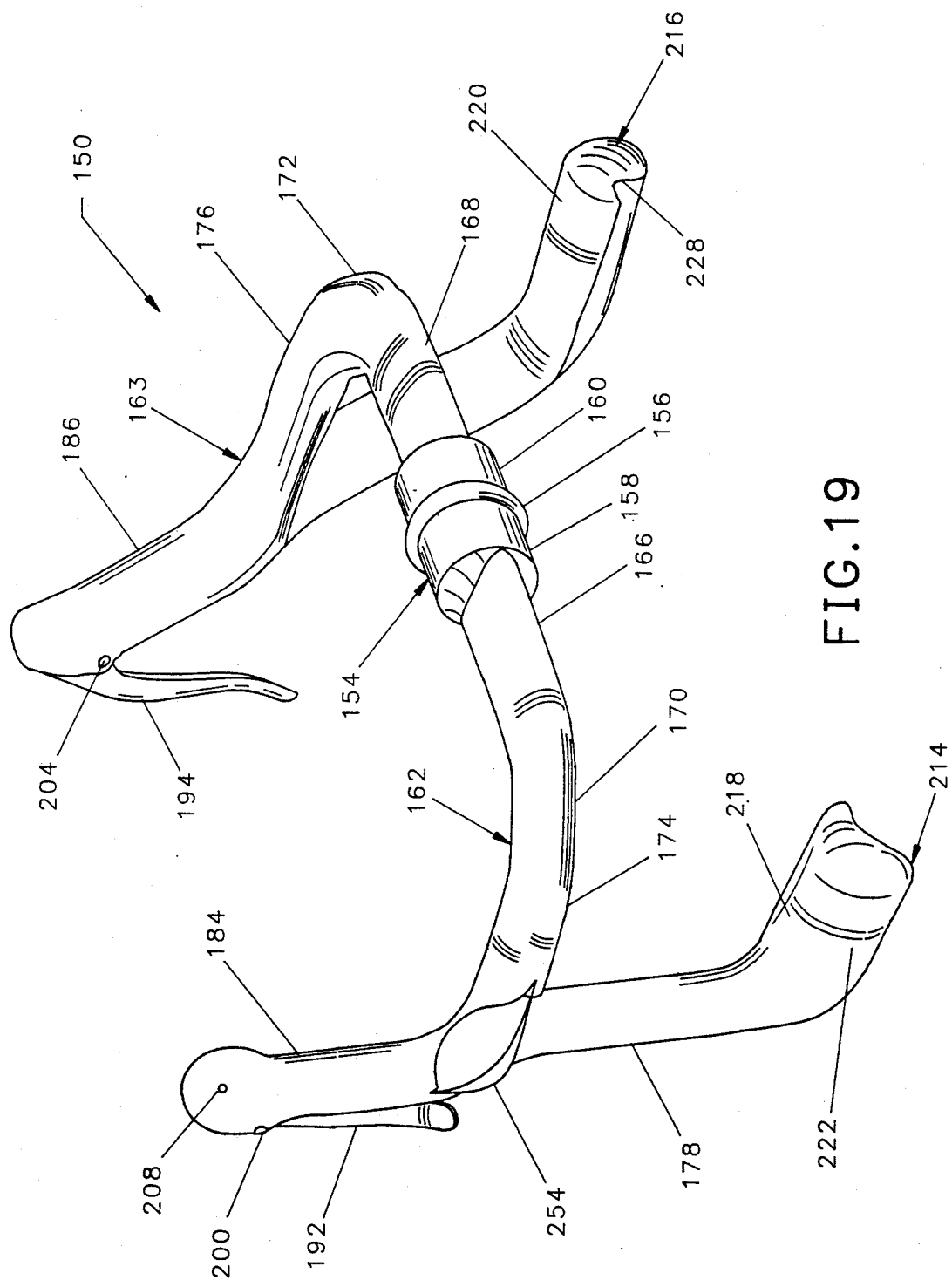
FIG. 19 is a perspective view of the embodiment shown in FIG. 15.

Adjoining the bottom ends of the downward sections 178, 180 are rearward extending hand grip sections 214, 216 located at the distal ends of the extensions 162, 163, respectively. As can be seen in FIG. 15, and 19, the hand grip sections 214, 216 provide enlarged curved upper surfaces 218, 220, which present a relatively broad surface and are complementary to the palm of the hand of a rider. The handgrip sections 214, 216 have a generally comma shaped cross-section somewhat similar to the sections 36, 38 of the first embodiment. The tail of the comma corresponding to the curved upper surfaces 128, 220. The outer edges 222, 224 of the handgrip sections 214, 216 also have enlarged curves which are complementary to the curl of the rider's fingers and which correspond to the circular end of a comma. Finally the handgrip sections have longitudinal recesses 226, 228 along their respective undersides for receiving the rider's finger tips which complete the comma shape of the cross-section.

Figure 20:
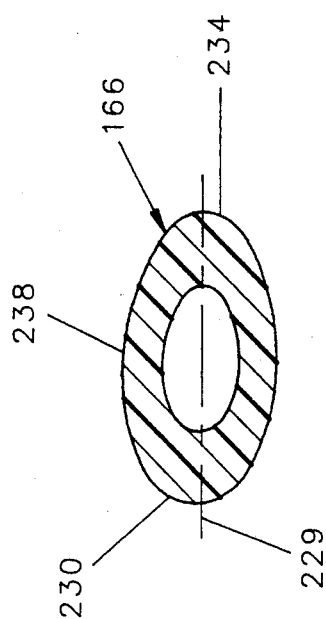
FIG. 20 is a cross-sectional view taken along the line 20—20 of FIG. 15.

As can be seen in FIG. 20, the cross-sections of the horizontal straight sections 166, 168 and similarly the cross-sections of the angle sections 170, 172 and the forward sections 174, 176 are generally elliptical in shape with the principal longitudinal axis 229 of the ellipse being substantially horizontal. The curve of the upper surfaces 238, 240 of the straight sections 166, 168 are complementary to the palm of the rider's hand and the leading edges 230, 232 and the trailing edges 234, 236 of these sections are complementary to the curl of the rider's fingers and thumb respectively. The elliptical cross-sections continues outwardly through the angle sections 170, 172 and forward sections 174, 176 such that these sections also have broad upper surfaces 242, 244 with long radii and rounded inner and outer edges 246, 248 and 250, 252 respectively with shorter radii. The sections 174, 176 have adjacent the junction with the pedestals 184, 186, and above the junction with downward sections 174, 176, outward projecting enlargements 254, 256.

Figure 21:
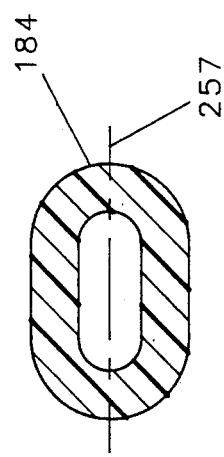
FIG. 21 is a cross-sectional view taken along the line 21—21 of FIG. 17.
Figure 17:
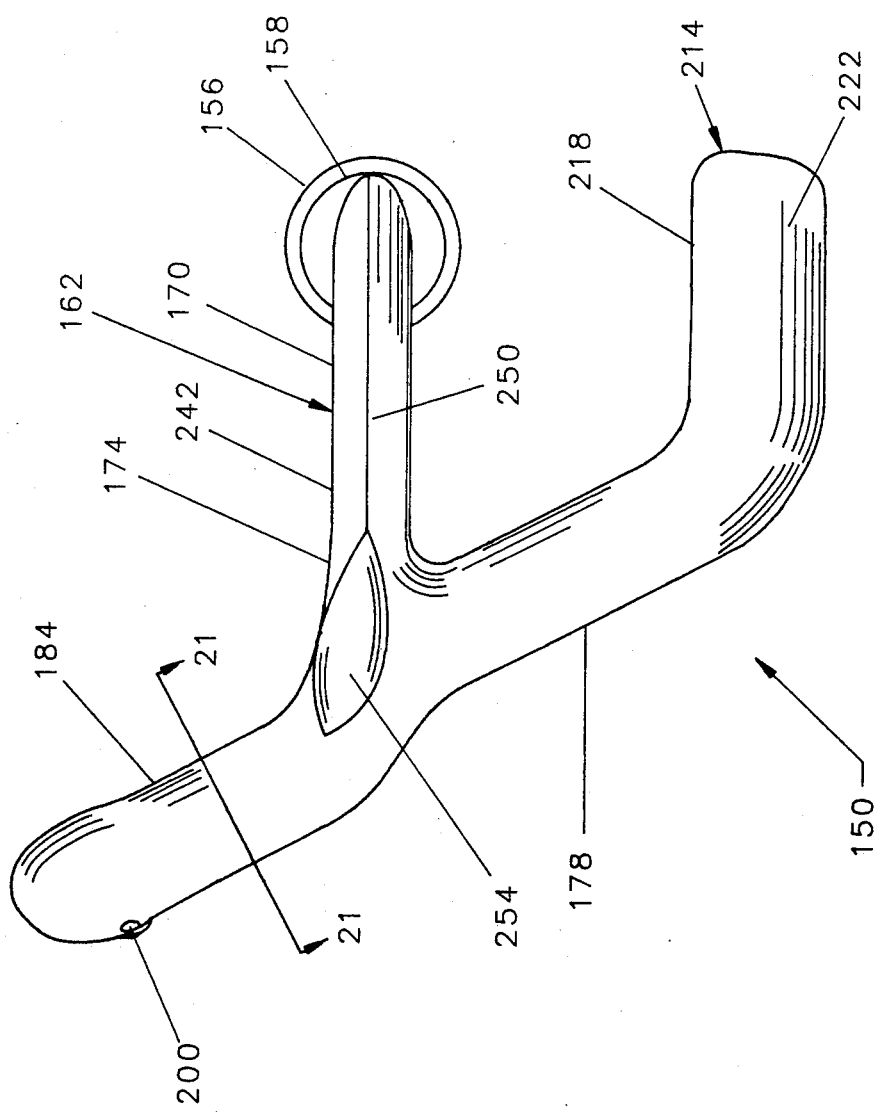
FIG. 17 is an end view of the embodiment shown in FIG. 15.
Figure 18:
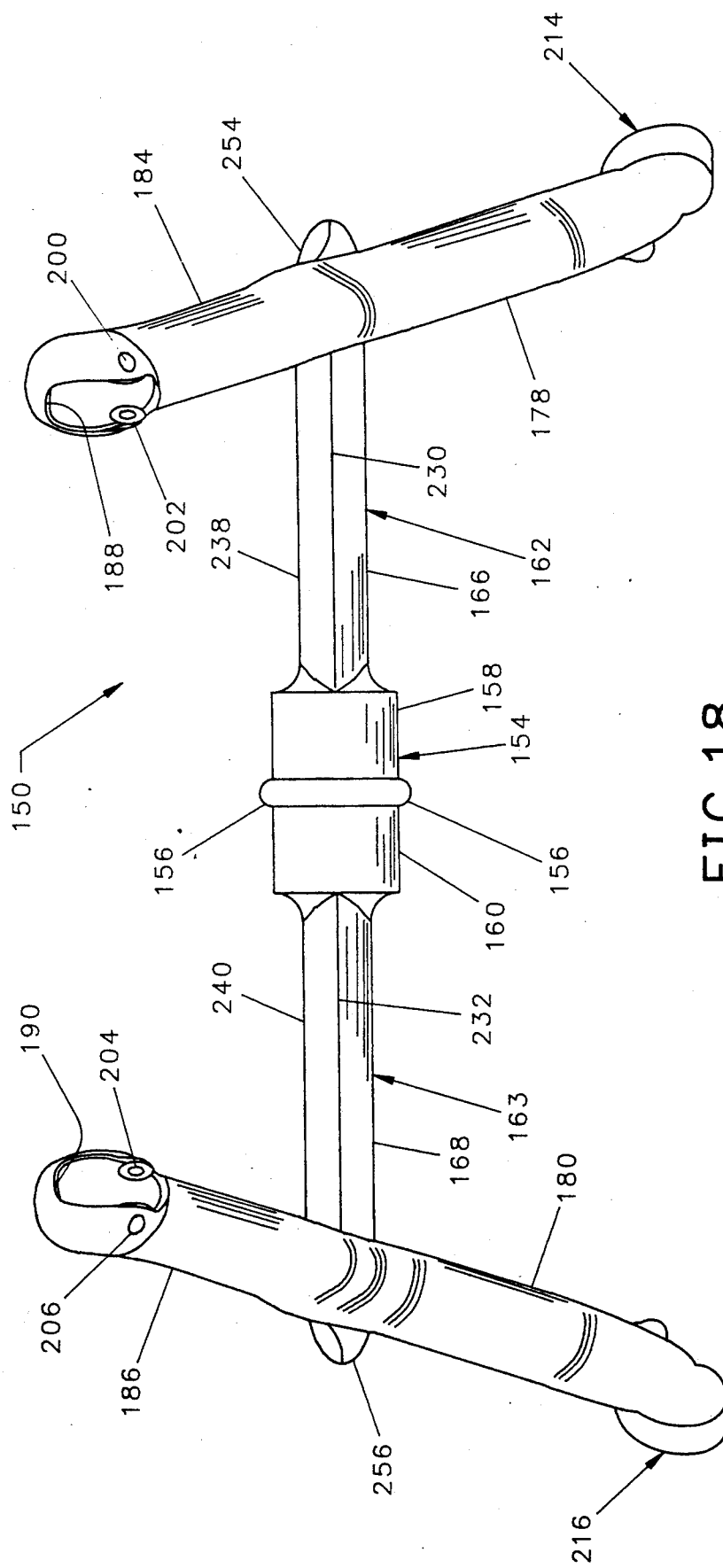
FIG. 18 is a rear view of the embodiment shown in FIG. 15.

Referring to FIG. 21, a cross-section of the pedestal 184 which is similar to the cross-sections of the downward sections 178, 180 is substantially oval in shape with the principal longitudinal axis 257 of the oval being rotated inward approximately 60° from the longitudinal axis through the mounting section 154 of the steering member.

The second embodiment provides specific gripping positions for a rider, several of which have characteristics similar to those shown in FIGS. 11 to 14 of the first embodiment. The straight sections 166, 168 can be grasped with the palm of the hand on the upper surfaces 238, 240 with the fingers curled around the leading edges 230, 232, and the thumbs around the trailing edges 234, 236. The angle sections, 170, 172 and the forward sections 174, 176 can be grasped with the palm of the rider's hand on the upper surfaces 250, 252, with the fingers curled around the outer edges 242, 244 and the thumbs around the inner edges 246, 248. The rider may grasp the steering member 150 with his thumbs and index fingers around the pedestals, 184, 186, his palms on upper surfaces 250, 252, and his remaining finger around the outward projecting enlargements 254, 256. A rider may also grasp the downward sections 178, 180 or the pedstals 184, 186 along the lengths of these sections, or he may grasp the curve portions between the downward sections 178, 180 and horizontal sections 218, 2230 or the curved portion between the pedestals 184, 186 and horizontal sections 174, 176 respectively. The rider can easily operate the brake levers 192, 194 while grasping the pedestals 184, 186.

Finally, a rider may grasp the hand grip sections 214, 216 with the palm of his hand on the upper curved surfaces 218, 220, the fingers around the outer edges 222, 224 with the tips of his fingers resting in recesses 226, 228, and the thumbs around the inner curve of the hand grip sections 214, 216.

A third embodiment is shown in FIG. 22 to FIG. 26. In this embodiment a steering member 300 has in its center a stem mounting section 304. The stem mounting section 304 includes a centrally located annular ridge 306 transverse to the length of steering member, and cylindrical sections 308 and 310 adjacent opposite sides of the annular ridge 306. A clamp, attached to the stem to the front wheel, not shown, is adapted to accept the annular ridge 306 and grasp a cylindrical sections 308, 310 to hold the steering member in a position transverse to the stem. The steering member 300 may be rotated around its longitudinal axis while within the clamp as described in the first two embodiments.

Adjacent the outer ends of cylindrical sections 308, 310 and extending axially outwardly therefrom are extensions 311, 312, which have horizontal sections 314 and 316 adjacent the cylindrical sections 308, 310, respectively. Outwardly of horizontal sections 314 and 316 are first curved sections 320, 322 respectively which turn the further extensions of the steering member 300 into a partially upward and secondarily rearward direction. Axially upwardly and rearwardly ends of the first curved sections 320, 322 are second straight sections 324 326. Axially outwardly of the second straight sections 324, 326 are second curved sections 330, 332 respectively which reduce the upward angular direction of the steering member such that the further extensions of the steering member 300 approach a horizontal orientation. Axially outwardly of the second of the second curved sections 330, 332 and adjacent the distal ends of the extensions 311, 312 are outwardly and somewhat rearwardly projecting hand grip sections 336, 338 respectively.

As best shown in FIG. 26, the horizontal sections 314, 316, the first curved sections 320, 322, and the straight sections 324, 326 have narrow planar upper surfaces 340, 341 and longer vertical forward surfaces 342, 343 and rearward surfaces 344, 345. The forward surfaces 342, 343 and the rearward surfaces 344, 345 are substantially parallel to one another near their respective ends where they join to the upper surfaces 340, 341, but the lower portions of these surfaces taper toward each other, and connect along rounded lower ridges 346, 347.

The portion of the hand grip sections 336, 338 adjacent the second curved sections 330, 332 are provided with forwardly directed protrusions 350, 352 having respective apertures 354, 356 therein for receiving brake levers 358, 360. The brake levers 358, 360 are pivotally mounted within the apertures 354, 356 on pins, not shown, which pass through holes 366, 368 and 370, 372 respectively. One end of a wire surrounded by a sheathing, not shown, is attached to each brake. The other ends of the wires from each brake are passed through holes 374, 376 and are attached to the associated brake levers 358, 360. The sheathings surrounding the wires are attached to the steering member 300 by clamps inserted in the holes 374, 376, such that compression of the brake levers draws the metal wire through the sheathing to actuate the brakes. As with prior steering members, one lever actuates a brake on the rear wheel and the other lever actuates a brake on the front wheel.

As can be seen in FIG. 24 the hand grip sections 336, 338 have a generally comma-shaped cross-section with curved upper surfaces 380, 382 having relatively long radii which present broad horizontal surfaces complementary to the palm of the hand of a rider, and which corresponds to the tail of the comma. The leading edges 384, 386 of the hand grip sections 336, 338 are also curved and are complementary to the curl of the rider's fingers and correspond to the rounded end of the comma. Finally, the straight handgrip sections 336, 338 have longitudinal recesses, one of which 390 is shown, located along their underside for receiving the rider's finger tips and which complete the comma shape. The hand grip sections 336, 338 are further provided with rearward projections 392, 394 positioned behind the protrusions 350, 352 respectively with shapes which complement the crook between the thumb and palm of rider's hand.

The third embodiment of the present invention is a steering member adapted to be used on bicycles which are used to cross hills and rough terrain. Riders of such bicycles must grasp the steering member at its outer ends to maximize control of the vehicle, and therefore, grasping positions are not needed midway along the length of the steering member. The generally triangular cross-section of the steering member as shown in FIG. 26 provides strength which allowing flexibility to reduce the amount of shock transferred to the rider's hands. The hand grasp sections 336, 338 are adapted to be gripped with the rider's palm on the upper surfaces 380, 382, the rider's fingers wrapped around the leading edges 384, 386 and the thumb under the steering member 300. The projections 392, 394 provide a comfortable rest for the fold between the thumb and index finger, and the fingers can comfortably fit into the longitudinal recesses 388, 390.

A fourth embodiment is shown in FIGS. 27 to FIG. 31. In this embodiment a steering member 400 has in its center a stem mounting section 404. The stem mounting section 404 includes a centrally located annular ridge 406 transverse to the length of steering member, and cylindrical sections 408 and 410 adjacent opposite sides of the annular ridge 406. A clamp, attached to the stem to the front wheel, not shown, is adapted to accept the annular ridge 406 and grasp the cylindrical sections 408, 410 to hold the steering member in a position transverse to the stem. The steering member 400 may be rotated around its longitudinal axis while within the clamp such that it can be adjusted to a position which is the most ergonomically desirable to the rider as with the other embodiments.

Adjacent the outer ends of the cylindrical sections 408, 410 and extending axially outwardly therefrom are extensions 411, 412 which the horizontal sections 414 and 416. Axially outwardly of horizontal sections 414, 416 and adjacent the distal ends of the extensions 411, 412 are hand grip sections 436, 438.

As best shown in FIG. 31, the horizontal sections 414, 416, have narrow planar upper surfaces 440, 441 and longer vertical forward surfaces 442, 443 and the rearward surfaces 444, 445 are substantially parallel to one another near their respective joinder to upper surfaces 440, 441 but the lower portions of these surfaces taper toward each other, and connect along rounded lower ridges 446, 447.

The portion of handgrip sections 436, 438 adjacent the horizontal sections 414, 416 are provided with forwardly directed protrusions 450, 452 with apertures 454, 456 therein respectively for receiving brake levers 458, 460. The brake levers 458, 460 are pivotally mounted within apertures 454, 456 on pins, not shown, which pass through holes 466, 468, and 470, 472 respectively. One end of a metal wire surrounded by a sheathing, not shown, is attached to each brake as in the prior embodiments. The other end of the wires from each brake are passed through holes 474, 476 and are attached to the associated brake levers 458, 460. The sheathings surrounding the wires are attached to the steering member 400 by clamps inserted in the holes 474, 476 such that compression of the brake levers draws the metal wire through the sheathing to actuate the brakes. As with prior steering members, one lever actuates a brake on the rear wheel and the other lever actuates a brake on the front wheel.

As can been seen in FIG. 30 the handgrip sections 436, 438 have a generally comma shaped cross-section with curved upper surfaces 480, 482 having relatively long radii which present broad horizontal surfaces complementary to the palm of the hand of a rider, and correspond as the tail of a comma. The leading edges 484, 486 of the handgrip sections 436, 438 are also curved are complementary to the curl of the rider's fingers and correspond to the rounded end of a comma. Finally, the straight handgrip sections 436, 438 have longitudinal recesses, one of which 488 is shown, which are adapted to receive the rider's finger tips and complete the comma cross-section. The hand grip sections 414, 416 are further provided with rearward projections 492, 494 positioned behind the protrusions 450, 452 respectively which complement the crook between the thumb and the palm of the rider's hand.

The invention is best manufactured using a hollow mold with plastic injected into the mold and a heated compressed gas injected in the center of the steering member to make the center hollow. Utilization of certain plastics, such as sold under the trademark ULTEM by General Electric Company, will result in a steering member with up to five times the minimum strength required of such steering members, but with a far greater degree of flexibility than provided by metal steering members.

While the present invention has been described in connection with a plurality of four embodiments, it will be apparent to those skilled in the art that many changes and modifications may be made without departing from the true spirit and scope of the present invention. Therefore, it is intended by the appended claims to cover all such changes and modifications which come within the true spirit and scope of this invention.

What is claimed:

1. A steering member for a bicycle having a stem, attaching means having two sides for attaching to the stem of a bicycle, and
a pair of unitary extensions extending axially outwardly of said attaching means, one of said unitary extensions being provided on each side of said attaching means, each of said unitary extensions comprising in combination:
a horizontal section positioned to extend axially outwardly from one of said sides of said attaching means,
a first curved section positioned axially outwardly of said horizontal section, said first curved section adapted to turning further outward portions of said extension in a forwardly downward direction,
a neck disposed below said first curved section of said extension,
a bulbous portion positioned below said neck on said extension, said bulbous portion having a cross-section greater than a cross-section of said neck—said bulbous portion being receive the palm and fingers of a human hand when the index finger and thumb of said human hand are wrapped around said neck,
a second curved section on said extension below said bulbous portion, said second curved section being axially outwardly of said bulbous portion, and turning further outwardly portions of said extension in a backward direction, and
a grip section axially outwardly of said second curved section and positioned at the distal end of said extension, said grip section being adapted to be grasped by a human hand.

2. A steering member for a bicycle having a stem, attaching means having two sides for attaching to the stem of a bicycle,
a pair of extensions extending axially outwardly of said attaching means, one of said extensions being provided on each of said sides of said attaching means, each of said extensions comprising in combination:
a horizontal section positioned to extend axially outwardly from each of said sides of said attaching means,
a first curved section axially outwardly of said horizontal section, said first curved section turning further outwardly portions of said extension in a forwardly downward direction,
a neck disposed below said first curved section on said extension,
a bulbous portion positioned below said neck on said extension, said bulbous portion being adapted to receive the palm and fingers of a human hand when the index finger and thumb of said human hand are wrapped around said neck,
a second curved section positioned on said extension below said bulbous portion,
said second curved section having a lower arc, and said second curved section turning further outward portions of said extension in a backward direction,
said bulbous portion having a projection extending below said lower arc of said second curved section, and
a grip section axially outwardly of said second curved section and positioned at the distal end of said extension, said grip section being adapted to be grasped by a human hand.

* * * * *

UNITED STATES PATENT AND TRADEMARK OFFICE
CERTIFICATE OF CORRECTION

PATENT NO.  : 5,165,301
DATED       : November 24, 1992
INVENTOR(S) : David R. Jeshurun and Joe Toth It is certified that error appears in the above-identified patent and that said Letters Patent is hereby corrected as shown below:

In column 2, line 19, after "from" insert --the left--.
In column 3, line 34, after "respectively" delete "through" and substitute --thereof--.
In column 5, line 46, after "Outwardly", delete "ends".
In column 7, line 38, after "rearwardly" delete "ends".
In column 8, line 65, after "which" delete "the" and substitute --have--.
In eolumn 10, line 13, beginning of the line, delete "adapted to ".
In column 10, line 14, after "forwardly" insert --and--.
In column 10, line 19, after "neck" delete "--".
In column 10, line 20, after "being" insert --adapted to--.
In column 10, line 19, after "neck" insert --,--.

Signed and Sealed this

Eighteenth Day of January, 1994

BRUCE LEHMAN

Attest:

Attesting Officer

Commissioner of Patents and Trademarks